INVENTORS
FRANCIS ROBACH
ANTOINE SALVI

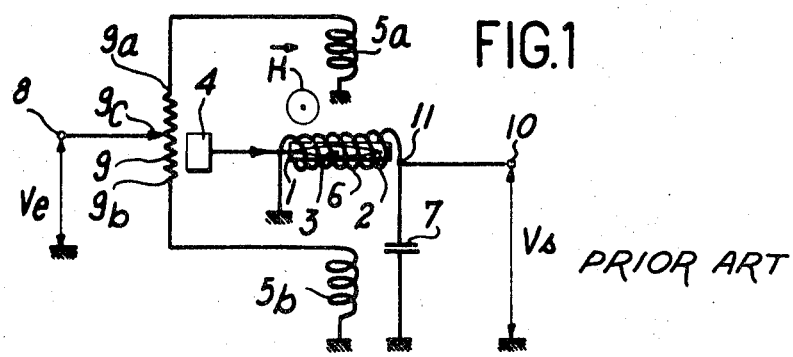
FIG.1 PRIOR ART
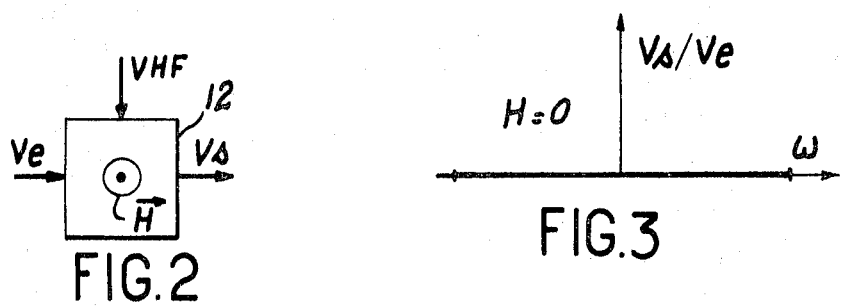
FIG.2
FIG.3
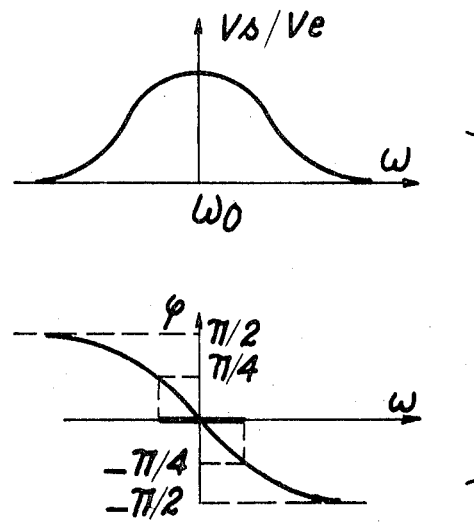
FIG. 4
INVENTORS
FRANCIS ROBACH
ANTOINE SALVI
BY *William W. Stokes*
ATTORNEY

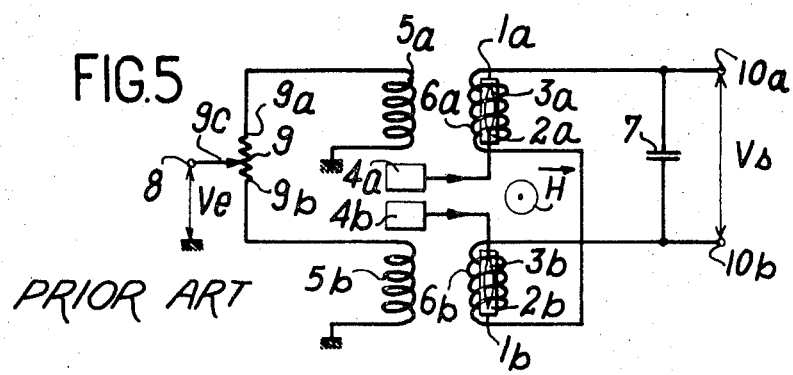
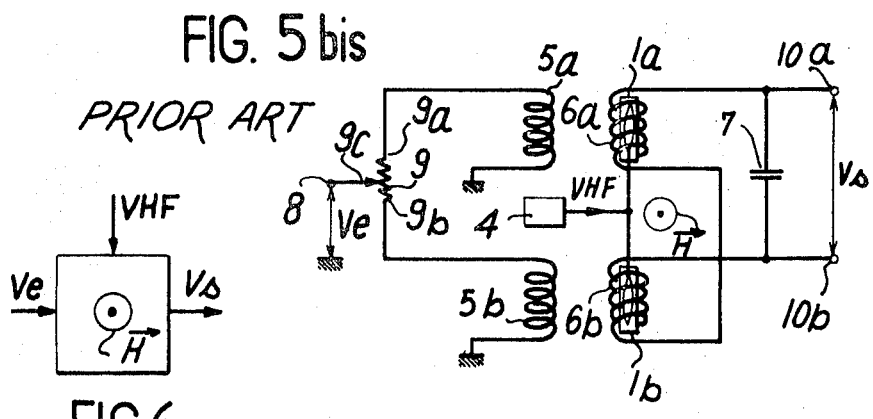
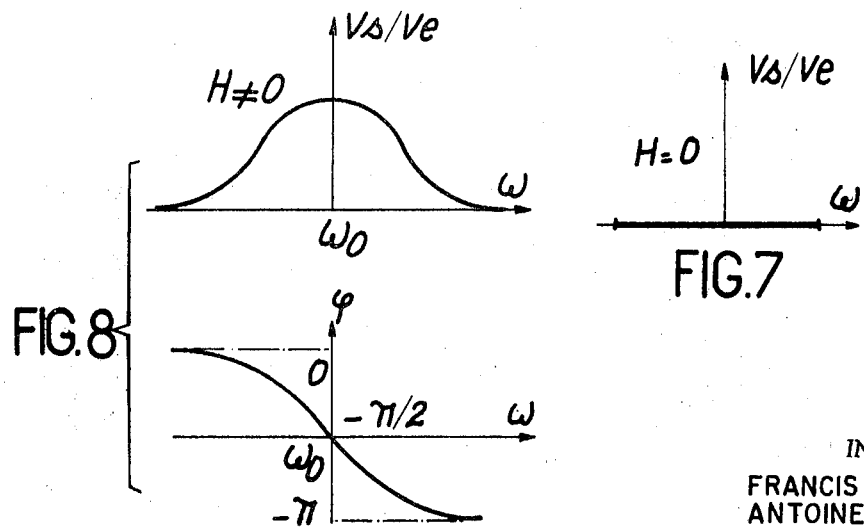

BY *William W. Stokes*

ATTORNEY

INVENTORS
FRANCIS ROBACH
ANTOINE SALVI

ATTORNEY

United States Patent Office 3,559,045
Patented Jan. 26, 1971

3,559,045
NUCLEAR MAGNETIC RESONANCE MAGNETIC GRADIOMETERS
Francis Robach, St-Martin-d'Heres, and Antoine Salvi, Fontaine, France, assignors to Commissariat a l'Energie Atomique, Paris, France
Filed Dec. 6, 1968, Ser. No. 781,794
Claims priority, application France, Dec. 13, 1967, 132,121
Int. Cl. G01n 27/00; G01f 1/00
U.S. Cl. 324—.5
9 Claims

ABSTRACT OF THE DISCLOSURE

The magnetic gradiometer for measuring the difference between the magnetic fields in two areas comprises two nuclear filters located one in each area. Each nuclear filter, of the type using the Overhauser-Abragam effect, delivers an output signal which is amplified and applied to one of the two inputs of an operational amplifier. The output of the amplifier is split and applied to the input coil of the two filters. A phasemeter measures the phase difference between the inputs of the operational amplifier, which is of the summing or differential type depending upon the type of nuclear filter (crossed coils or parallel coils): the phase shift is in direct relation with the field difference.

---

The invention relates to improvements in magnetic gradiometers, that is in devices for measuring magnetic field gradients. It relates more particularly, but not exclusively, to the gradiometers adapted to measure localized and eventually fast spatial variations of the earth's magnetic field, for instance for prospection or detection purposes.

It is an object of the invention to provide a gradiometer which is more accurate and more precise in measuring magnetic field gradients than the prior art devices while having a low power consumption and being rugged in operation.

According to the invention there is provided a magnetic gradiometer for measuring the difference between the magnetic field intensities in a first and in a second area which comprises, in combination:

A first and a second nuclear filter respectively located in said first and second areas, each having—

At least one sample comprising a solution of a paramagnetic substance having an electronic resonance line at a frequency which is different from zero in a magnetic field tending toward zero, in a solvent providing a system of atomic nuclei, the magnetic moment and angular momentum of which are both different from zero;

Means for saturating said electronic resonance line; and

Input and output coils associated with said sample for respectively injecting and withdrawing electromagnetic energy at a frequency close to the nuclear resonance frequency of said system, said input coil and output coil being electrically decoupled;

An operational amplifier having two inputs;

Means for connecting the output coils of said filters to respective inputs of said amplifier, said nuclear filters, connecting means and amplifier being so constructed and arranged that the absolute values of signals applied to said inputs by said connecting means and due to said magnetic field intensities are added in said amplifier;

An adjustable voltage distributor between said amplifier and input coils and which splits the output voltage of said operational amplifier between the input coils of said two nuclear filters; and Means for measuring the phase difference between the two voltages across corresponding coils of said two nuclear filters, said phase difference being in substantially direct relation with the difference between the magnetic field intensities in the two areas where the two nuclear filters are located.

Description of various spin coupling nuclear filters suitable for use in the gradiometer according to the invention may be found in French patent specification Nos. 1,174,-136, 1,351,587 and particularly 1,447,226 and 1,500,971 in the name of Commissariat a l'Energie Atomique, to which reference may be had: The gradiometer may for instance comprise nuclear filters in which the input and output coils of the same filter are orthogonal and a single liquid is used, each nuclear filter having a single vessel containing that fluid. The gradiometer may also have nuclear filters whose input and output coils are parallel to a same direction, wherein each output coil consists in a pair of coil halves each of which is wound around a different vessel; the vessels then contain either a same liquid or two different liquids, but provision is made for saturating two opposed electronic resonance lines (one of the lines resulting in an increase in absorption at the nuclear frequency and the other in stimulated energy emission) in the two vessels. The embodiment with parallel coils appears preferable, since it makes it possible to design a gradiometer having a single forbidden axis by locating the input and output coils of both nuclear filters parallel to a common direction. This forbidden axis may even be suppressed by using nuclear filters of the type disclosed in French patent specification 1,500,971 to which reference may be had for a more complete description.

The invention will be better understood from the following description which refers to the accompanying drawings, wherein:

FIG. 1 schematically illustrates a spin coupling nuclear filter using the Overhauser-Abragam effect, having input and output coils orthogonal to each other;

FIG. 2 is a simplified circuit (black box) equivalent to the filter of FIG. 1;

FIGS. 3 and 4 show the variations of the output voltage in zero field (FIG. 3) and the variations of the output voltage and phase in a magnetic field (FIG. 4) of the nuclear filter of FIGS. 1 and 2 as a function of the pulsation $\omega$ of the input voltage;

Figure 9:
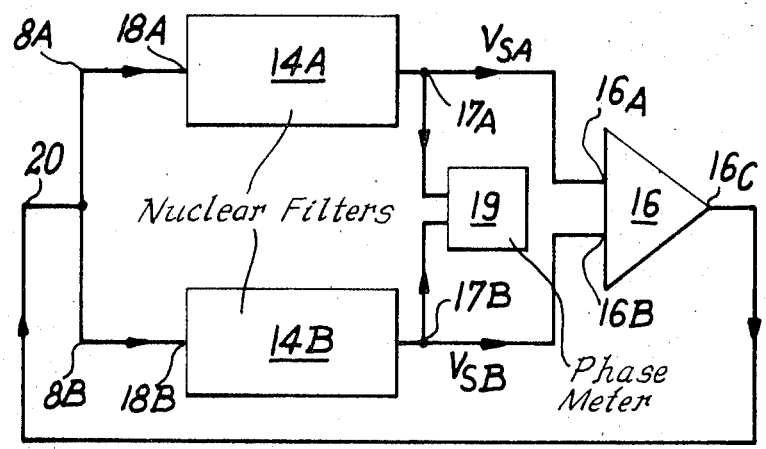
Figure 10:
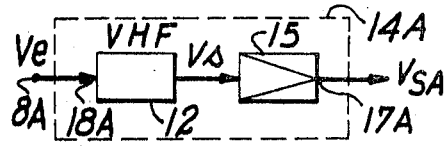
Figure 11:
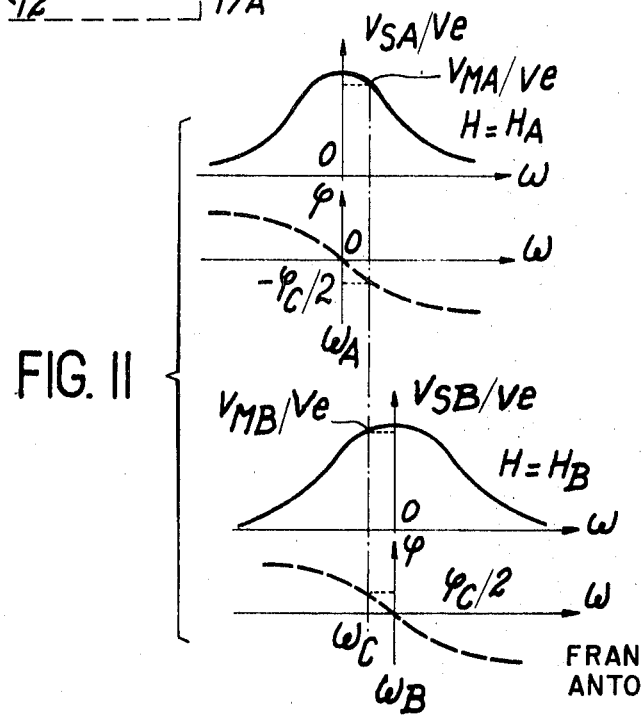
Figure 12:
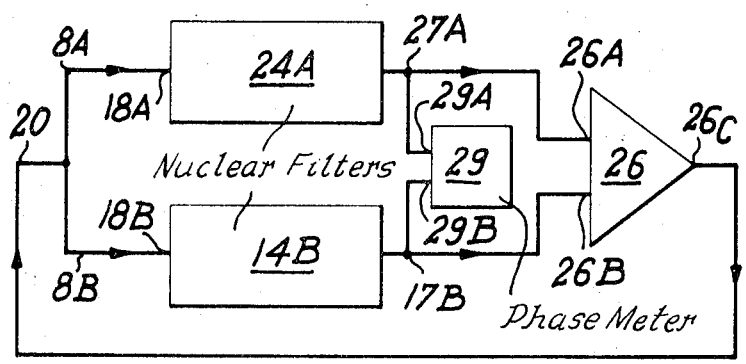
Figure 13:
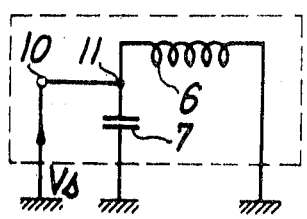
Figure 14:
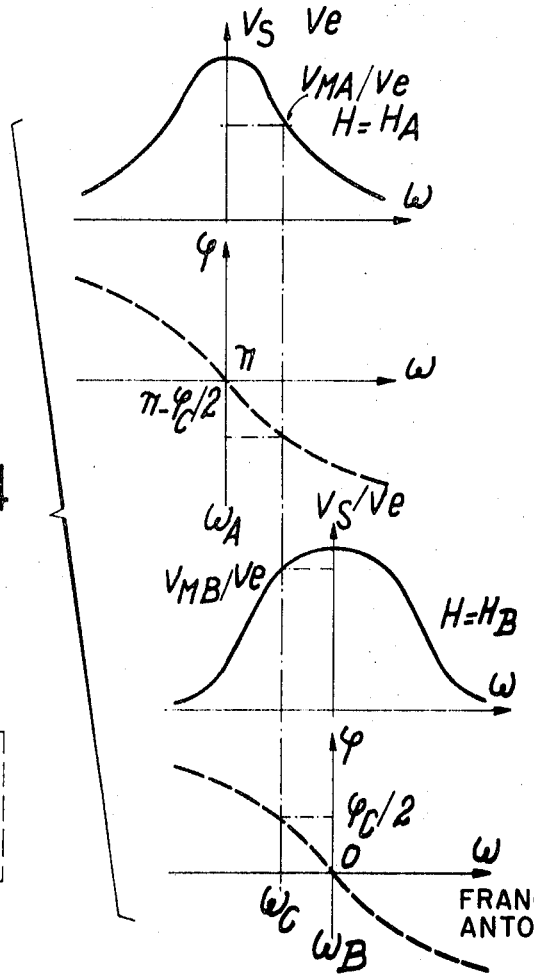
Figure 15:
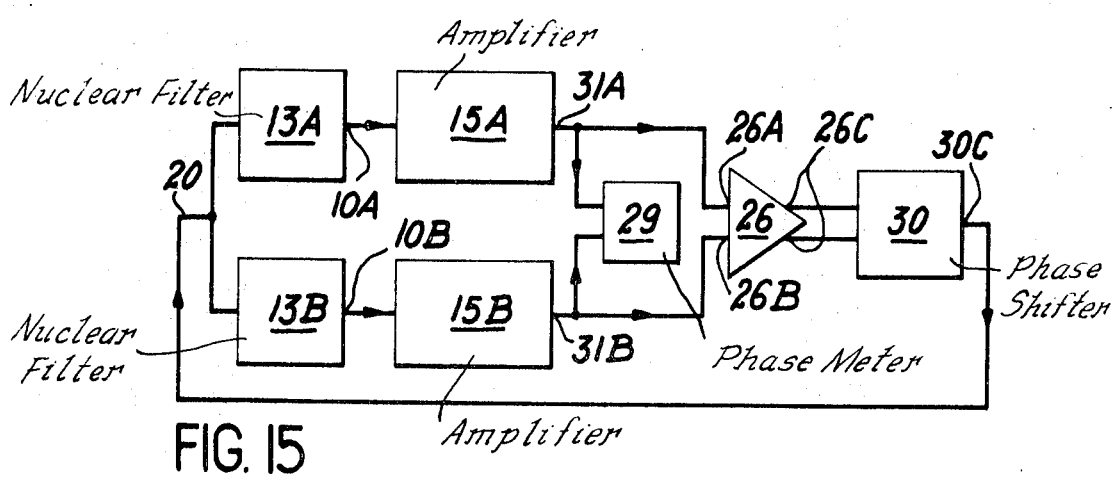
Figure 16:
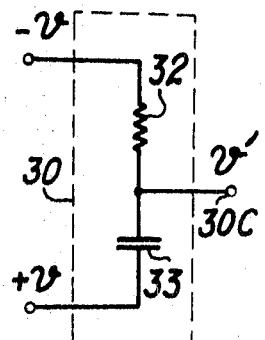
Figure 17:
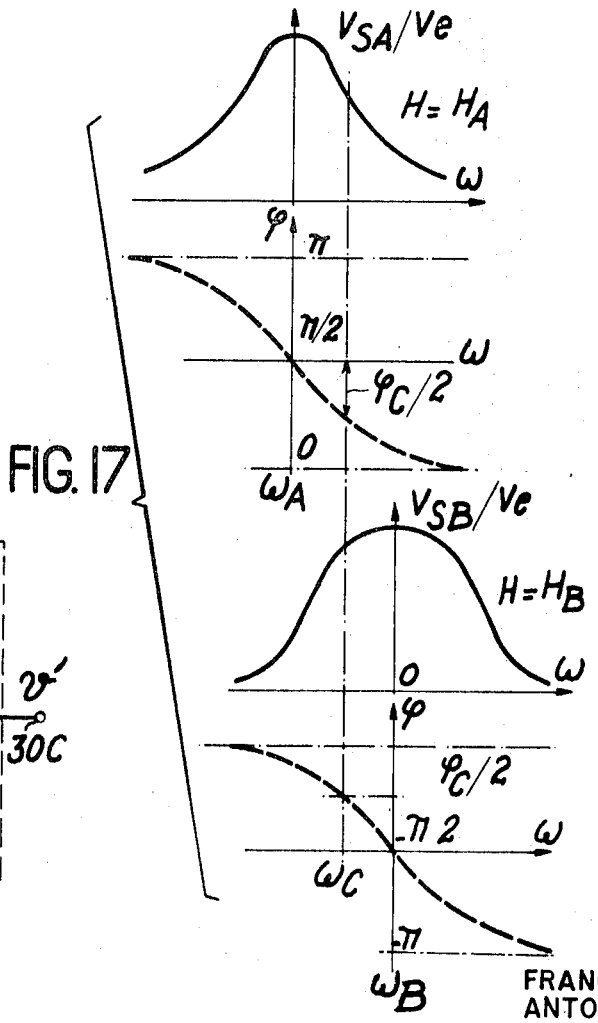

FIG. 5, similar to FIG. 1, illustrates a nuclear filter having input and output coils parallel to each other;

FIG. 5 bis illustrates a modification of FIG. 5;

FIG. 6, similar to FIG. 2, is a simplified circuit equivalent to that of FIG. 5;

FIGS. 7 and 8 are similar to FIGS. 3 and 4, but correspond to the nuclear filter of FIGS. 5 and 6;

FIG. 9 is a schematic representation of an embodiment of a gradiometer having two nuclear filters of the type illustrated in FIG. 1;

FIG. 10 illustrates a detail of the filters of FIG. 9;

FIG. 11 shows the variations of the output voltage and phase of the two nuclear filters of FIG. 9 as a function of $\omega$;

FIG. 12 illustrates a modification of the gradiometer of FIG. 9;

FIG. 13 illustrates one of the modifications to be made in the circuit of FIG. 9 for resulting in the modified embodiment of FIG. 12;

FIG. 14 shows the variations of the amplitude and phase of the nuclear filters of FIG. 9 as a function of $\omega$;

FIG. 15 is a schematic illustration of an embodiment of the gradiometer incorporating two nuclear filters of the type shown in FIG. 5;

FIG. 16 is a schematic representation of the phase shifter included in the gradiometer of FIG. 15;

FIG. 17 shows the variations of the output voltage and phase of the nuclear filters of FIG. 15 as a function of $\omega$.

The main difference between the embodiment of FIG. 1 and that of FIG. 5 resides in that the input and output coils are crossed in the first case and are parallel in the second case.

The coil arrangement of the first embodiment has the advantage of providing electromagnetic decoupling between the output and input coils when no nuclear resonance is present, but this advantage is more than balanced by a drawback: the nuclear filter has two forbidden axes, corresponding to the axes of the input and output coils. This shortcoming is overcome in the embodiment of FIG. 5 which has a single forbidden axis. Since in this embodiment there is permanent coupling between the parallel input and output coils, the nuclear filter comprises two vessels and a pair of coil halves associated into each vessel, the coil halves being so connected that the resulting coupling between the complete input coil and the complete output coil be zero when there is no nuclear resonance. This may be done rather easily, without substantial increase in the size and power consumption and the latter embodiment will be preferable in most cases.

The construction and operation of the two nuclear filters which are respectively illustrated in FIGS. 1 and 5 will now be shortly reminded; reference may also be had to French patent specification No. 1,447,226 referred to above.

The nuclear filter illustrated in FIG. 1, of the type having an input coil orthogonal to the output coil, includes:

A vessel 1 containing a liquid 2 consisting of a solvent (such as deoxygenated water) providing atomic nuclei (such as protons) the magnetic moment and angular momentum of which are both different from zero whereby their gyromagnetic ratio $\gamma$ is well determined and not zero ($\gamma = 267.513 \times 10^6$ teslas/seconde for the proton in deoxygenated water) and of a paramagnetic substance (free ion or free radical with an unpaired electron) such as $NO(SO_3)_2$ or DTBN dissolved in the solvent and having an electronic resonance line at a frequency different from zero even in a magnetic field tending toward zero; saturation of the electronic resonance line by an applied electromagnetic field at a frequency close to that of the line causes either an inversion in the spin population or an enhancement of the population difference, due to interaction of the nuclear spins of the solvent and of the electronic spins of the substance;

A coil or loop 3 coupled with the liquid 2 of vessel 1 and fed by a VHF oscillator 4 at a frequency $f$ substantially equal to the electronic resonance frequency (about 55 mc./sec. for nitrodisulfonate $NO(SO_3)_2$ and 70 mc./sec. for ditertiobutylnitroxide); a condensator (not shown) is connected in parallel with coil 3 for the coil to dissipate in the liquid an amount of electromagnetic energy large enough for saturating the electronic resonance line of the substance;

An input or injection coil, preferably split into two halves 5a and 5b, and an output coil 6. The input coil 5a–5b is so connected that it receives an input electromotive force Ve at a frequency $$f = \frac{\gamma}{2\pi} H$$

wherein H is the intensity of the magnetic field in the area where the vessel is located. The output coil constitutes with a condenser 7, preferably adjustable, a resonant circuit 6–7 having a resonance frequency close to frequency $f$. Coil 5a–5b and coil 6 are coupled to the liquid 2 and are respectively adapted to bring electromagnetic energy to the liquid and to remove energy therefrom at a frequency close to $f$.

The operation of a spin-coupling nuclear filter of the above type using the Overhauser-Abragam effect and having crossed input and output coils as illustrated in FIG. 1 may be described as follows:

The system consisting of coils 5a–5b and 6 and of liquid 2 is subjected to:

An input potential difference Ve whose frequency is close to frequency $f$, applied between point 8 and the mass and split by a potentiometer into equal parts applied to the two coil halves 5a and 5b (each coil half being connected between the mass and one of the terminals 9a and 9b of the potentiometer 9 whose mid-point is connected to input 9);

A VHF field at the electronic resonance frequency F of liquid 2; and (ii) The two liquids 2a and 2b may be different and contain two paramagnetic substances for which the same VHF frequency saturates two opposite electronic lines in the two liquids. In that case a single VHF generator 4 is necessary, as indicated on FIG. 5 bis which is identical to FIG. 5 but for the provision of a single VHF oscillator 4 which feeds both coils 3a and 3b in lieu of the two generators 4a and 4b on FIG. 5. One of the two substances may be ditertiobutylnitroxide in a solvent consisting of 50% water and 50% acetone in volume and the other substance may be triacetonamine nitroxide dissolved in a solvent consisting of 70% water and 30% ethylene-glycol in volume. In that case an electric field at 68.5 mc./s. saturates a lower electronic resonance line of the first liquid (whereby energy absorption is increased) and an upper electronic resonance line of the second liquid (resulting in stimulated energy emission).

Another couple of suitable paramagnetic free radicals consists of triacetonamine nitroxide referred to above and tetramethyl 2,2,6,6 azo 1 cyclo - hexanoneoxime 4 oxide 1 whose formula is $NO[C(CH_3)_2CH_2]C—NOH$.

(iii) Still another possibility consists in selecting a same paramagnetic substance for the two liquids and two different solvents, the substances and solvents being so selected that two opposite electronic resonance lines are saturated at the same frequency in the two liquids, one in each liquid. In that case too a single VHF generator is sufficient. For instance the first liquid may be a solution $10^{-3}$ M of triacetonamine nitroxide in pure dimethoxyethane and the other may consist in a solution $10^{-3}$ M of the same substance in a mixture of 73% dimethoxyethane and 27% water. A more complete explanation of that solution may be found in French patent specification No. 1,521,587 in the name of Commissariat a l'Energie Atomique.

The operation of the nuclear filters of FIGS. 5 and 5 bis will now be explained with reference to FIGS. 6, 7 and 8 which are similar to FIGS. 2, 3 and 4. On FIG. 6 a single VHF input has been illustrated but in fact two such inputs may be provided as in FIG. 5 for simultaneous energization or de-energization. As shown on FIG. 7 Vs/Ve is zero for any value of $\omega$ as long as the magnetic field H is zero, since the pair of output coil halves is decoupled from the pair of input coil halves considered as a whole.

When the nuclear filter is subjected to a magnetic field having a value H and the coils 3a and 3b are energized, each input sine wave having an amplitude Ve and for which $\omega$ is close to $\omega_0$ results in an output electromotive force having an amplitude Vs and the Vs/Ve ratio is given by the upper curve on FIG. 8. Vs/Ve reaches a maximum for $\omega = \omega_0$ while the phase shift $\varphi$ between the output voltage Vs and the input voltage Ve is different from that of FIG. 4 since $$\varphi = -\frac{\pi}{2}$$

(and not zero) when $\omega = \omega_0$. The phase shift $\varphi$ varies from zero up to $-\pi$ as $\omega$ varies from $-\alpha$ to $+\alpha$.

The construction and operation of gradiometers according to the invention will now be described with reference to FIGS. 9 to 17. Reference will more specifically be had to (i) a gradiometer using two nuclear filters having orthogonal coils (FIGS. 9–14) and (ii) a gradiometer using two nuclear filters having parallel coils (FIGS. 15–17).

The gradient meter with two crossed coils as illustrated in FIGS. 9 and 10 comprises:

Two identical units 14A and 14B each comprising (as illustrated in FIG. 10 which represents the unit 14A) a nuclear filter 12 with crossed coils (of the type illustrated in FIGS. 1 and 2) and advantageously a linear amplifier 15, preferably with adjustable gain and narrow pass-band which is centered on the frequency $$f = \frac{\gamma}{2\pi} H$$

and therefore delivers in response to an input sinusoidal voltage having an amplitude $Ve$ an amplified sinusoidal voltage having an amplitude $V_s = GV_e$ where G designates the voltage gain of the amplifier. Each unit 14A, 14B therefore constitutes a nuclear band-pass filter, the central frequency of which is equal to the magnetic-field strength at the point at which the vessel containing the paramagnetic solution is located multiplied by the constant factor $\gamma/2\pi$;

An operational amplifier consisting of a summing amplifier, the two inputs 16A and 16B of which are connected to the outputs 17A and 17B of the units 14A and 14B respectively and the output 16C of which supplies current in parallel to the inputs 18A and 18B of the units 14A and 14B. The supply of current can be carried out through a potentiometer (not shown), the sliding contact of which is connected to the output 16C and the terminals of which are connected to the inputs 18A and 18B; and A phase meter 19 for measuring the difference in phase between the output 17A of the unit 14A and the output 17B of the unit 14B.

The operation of the gradient meter of FIGS. 9 and 10 will now be described with reference to FIG. 11. The curves shown at the top of this figure correspond to the unit 14A and the curves shown at the bottom correspond to the unit 14B. In each case the variations of $\omega$ have been plotted as abscissae whilst $V_S/Ve$ (curves in full lines) or $\varphi$ (curves in broken lines) have been plotted as ordinates.

The notations adopted will be as follows: $H_A$ and $H_B$ designate the magnetic-field intensities at the locations of the filter vessels of the units 14A and 14B respectively (the spacing between these two vessels can be 60 cms., for example); $\Delta H = H_B - H_A$ designates the difference in magnetic field strength to be measured by the gradient meter; $\omega_A$ and $\omega_B$ designate the angular frequencies corresponding to the field densities $H_A$ and $H_B$, that is to say $\omega_A = \gamma H_A$ and $\omega_B = \gamma H_B$.

If a sinusoidal voltage having an amplitude $Ve$ (with respect to ground, not shown) and having a mean angular frequency $\omega_C = \frac{1}{2}(\omega_A + \omega_B)$ is applied at the point 20 (and therefore at the points 8A and 8B which correspond to the point 8 of FIG. 1), the output voltage $V_{SA}$ obtained at 17A and output voltage $V_{SB}$ obtained at 17B are displaced in phase by $-\varphi_C/2$ and $+\varphi_C/2$ with respect to $Ve$ respectively.

The summing amplifier 16 sums two voltages having the same amplitude (inasmuch as the effective output voltage $V_{MA}$ and $V_{MB}$ of the units 14A and 14B are substantially equal) and displaced in phase by $-\varphi_C/2$ substantially equal) and displaced in phase by $-\varphi_C/2$ voltage will therefore be in phase with the input voltage having an amplitude $Ve$. Since the output 16C of the amplifier 16 is connected to the point 20, there is thus provided a nuclear oscillator which operates at the frequency $f_C = 2\pi\omega_C = \pi\omega_A + \pi\omega_B$, the voltage $Ve$ which is applied at 20 being precisely the voltage which is delivered at the output 16C. In order to carry out the operation as an oscillator, it is only necessary to ensure that the gains of the amplifiers 15 of the nuclear filters 14A and 14B and of the summing amplifier 16 are sufficient to meet the condition of self-oscillation, the achievement of this result being facilitated by the increase in the intensity of the nuclear signal as a result of the Overhauser-Abragam effect.

It will be noted that, as long as $\varphi_C/2$ is small, that is to say as long as $H_B - H_A$ is small, which is usually the case (since the units 14A and 14B are close to each other), $\varphi_C/2$ is practically proportional to $\omega_B - \omega_C$ and $-\varphi_C/2$ is practically proportional to $\omega_A - \omega_C$. Therefore $\varphi_C$ is virtually proportional to $\omega_B - \omega_A$ and to $H_B - H_A$. In point of fact, the phase meter 19 measures $\varphi_C$. In consequence, if use is made of a phase meter 19 whose output is proportional to the difference in phase between the two input signals (having the same amplitude) which are applied thereto, the output of the phase meter 19 will be proportional to the gradient $\Delta H = H_B - H_A$ to be measured. In fact, the measurement of the phase is not critically dependent on the frequency $2\pi\omega_C$ of oscillation of the system. Tuning of the resonant circuits of the units 14A and 14B does not usually need to be adjusted in the case of each measurement since $\omega_A$ and $\omega_B$ vary only to a small extent from $\omega_0$ (mean value of angular frequency in the terrestrial magnetic field).

The circuit arrangement which is illustrated in FIGS. 9 and 10 provides zero phase displacement $\varphi_C$ when $H_A = H_B$. If it is desired to use a phase meter which produces zero response when the phase displacement between its two input voltages is not zero but equal to $\pi$, the arrangement can be modified to result in the circuit which is illustrated in FIGS. 12 and 13.

The gradient meter of FIG. 12 is distinguishable from that of FIG. 9 by the following differences:

The unit 14A of FIG. 9 has been replaced by a unit 24A in which the nuclear filter is no longer identical with that of FIG. 1 but comprises a tuned energy-extraction circuit 7–11 with a coil 6 which is wound in the opposite direction, as shown in FIG. 13 which represents the extraction circuit 7–11 of the filter which is incorporated in the unit 24A;

The operational amplifier is not a summing amplifier 16 but a differential amplifier 26, of which the output voltage at 26C is equal to the difference between the input voltages applied at 26A and 26B;

The phase meter 29 is of the type in which the output is proportional to the difference in phase between the input voltages applied at 29A and 29B as reduced by $\pi$, the output of the phase meter 29 being zero when this difference in phase between the points 29 and 29B is equal to $\pi$.

The operation of the circuit of FIGS. 12 and 13 differs from that of FIGS. 9 and 10 in that there exists a difference equal to $\pi$ between the phase of the signal at 27A and the phase of the signal at 17A in respect of a same value of the field: in fact, in the case of the unit 24, the phase curve is the second curve shown in FIG. 14 which represents the complete operation of the circuit of FIGS. 12 and 13 and which is similar to FIG. 11, apart from their second curve: in fact, we have $\varphi = 0$ when $\omega = \omega_C$ in the case of FIG. 11 whereas we have $\varphi = \pi$ when $\omega = \omega_C$ in the case of FIG. 14.

This phase displacement $\pi$ is reduced to zero by the phase meter 29 on the one hand and the amplifier 26 on the other hand, the difference between two voltages having the same amplitude $(V_{MB} = V_{MA})$ which are displaced by $+\varphi_C/2$ and $\pi - \varphi_C/2$ being equivalent to the sum of two voltages having the same amplitude which are displaced in phase by $+\varphi_C/2$ and $-\varphi_C/2$ with respect to $Ve$. The output signal of the differential amplifier 26 of FIG. 12 which is available at 26C is therefore in phase with $Ve$ in the same manner as the output at 16C of the summing amplifier 16 of FIG. 9.

The two circuits which are illustrated respectively in FIGS. 9 to 11 on the one hand and 12 to 14 on the other hand each make use of two nuclear filters with crossed coils in accordance with FIG. 1 (the extraction circuit of one of the filters can be modified as shown in FIG. 13).

On the contrary, FIGS. 15 to 17 show the manner in which a gradient meter can be constructed with two nuclear filters having parallel coils, that is to say in accordance with FIG. 5 or FIG. 5 bis; this gradient meter has in this case only one forbidden axis if the axes of the two filters are parallel.

The gradient meter which is illustrated diagrammatically in FIG. 15 comprises:

Two nuclear filters 13A and 13B. The filter 13B is similar to that which is illustrated in FIG. 5 or FIG. 5 bis and therefore has the responsive curve of FIG. 8. The filter 13A differs from the first solely in the fact that the direction of the coils $6a$ and $6b$ has been reversed so as to have a phase response curve which is displaced by $\pi$, $\varphi$ being equal to $+\pi/2$ when $\omega=\omega_0$;

Two linear amplifiers 15A, 15B which have preferably an adjustable gain and a narrow pass-band which is centered on the frequency $f=\gamma.H/2\pi$, these amplifiers being connected respectively to the outputs 10A and 10B of the filters 13A and 13B;

A differential amplifier 26 whose inputs 26A and 26B are connected to the outputs 31A and 31B of the amplifiers 15A and 15B respectively and the output 26C of which delivers a voltage which is equal to the difference between the input voltages;

A phase shifter 30 which displaces in phase by $+\pi/2$ the input voltage which it receives from the amplifier output 26C so as to deliver at 20 the voltage which is displaced in phase; as shown in FIG. 16, said phase shifter can be of the type comprising a resistor 32 and capacitor 33 (the diagram of FIG. 16 comprises two input voltages $v=\sin \omega t$ and $-v=-\sin \omega t$ and delivers an output voltage $v'=\sqrt{2} \cos \omega t$ which is displaced in phase by $\pi/2$ with respect both to $v$ and to $-v$;

A phase meter 29 which is connected between the outputs 31A and 31B and which is similar to that of FIG. 12, that is to say which has a zero output when its two input voltages are displaced in phase by $\pi$.

The operation of the circuit of FIG. 15 is illustrated in FIG. 17 which gives the response curves in amplitude (in full lines) and in phase (in broken lines) on the one hand of the assembly 13A–15A (curves at the top portion of the figure) and on the other hand of the assembly 13B–15B (curves at the bottom portion of the figure).

If the voltage applied at 20 takes the form $Ve. \cos \omega_C t$ wherein $t$ designates the time and $\omega_C$ designates the mean value $$\frac{\omega A + \omega B}{2}$$

we have:

$$V_{SA} = K \cos (\omega_C t + \frac{\pi}{2} - \frac{\varphi C}{2})$$

$$V_{SB} = K \cos (\omega_C t - \frac{\pi}{2} + \frac{\varphi C}{2})$$

In these formulae, K is the common amplitude of $V_{SA}$ and $V_{SB}$ which are the voltages available at 31A and 31B (FIG. 17). The phase meter 29 therefore measures a difference in phase $\pi-\varphi_C$, which is equal to $\pi$ when $H_A=H_B$.

The differential amplifier receives $V_{SA}$ and $V_{SB}$ and delivers a voltage having the form $$2 \sin \omega_C t. \cos \frac{\varphi C}{2}$$

as well as a voltage having the form $$-2 \sin \omega_C t. \cos \frac{\varphi C}{2}$$

these two voltages constitute the voltages $+v$ and $-v$ to be applied to the terminals of the phase shifter 30 constituted by a resistor 32 and a capacitor 33 in series (FIG. 16). At the output 30C of 30, there is obtained a voltage which is displaced in phase by $+\pi/2$, that is to say which takes the form $$\cos \omega_C t. \cos \frac{\varphi C}{2}$$

and which is therefore in phase with $Ve=\cos \omega_C t$, thereby making it possible to apply said voltage at 20 and to provide a self-oscillating circuit having an angular frequency $\omega_C$.

The adjustment of the oscillator is in any case not critical in regard to the measurement of phase which determines $\Delta H=H_B-H_A$ since frequency pulling does not influence the measurement of the phase $\varphi_C$ which is proportional to $\Delta H$.

In practice, provision will preferably be made in each unit for a number of capacitors which provide tuning frequencies spaced by a value corresponding to a constant interval of the order of 2000 gammas, for example. A manual switch serves to connect to each of said units the capacitor which corresponds to the suitable range of frequency (and therefore of magnetic field). The capacitors must be adjusted so that the interval between the tuning frequencies of both units does not exceed approximately 1% inasmuch as a longer interval introduces an error which is not negligible.

The gradient meter which is illustrated in FIG. 15 comprises only a single forbidden axis when it makes use of nuclear filters of the type shown in FIG. 5, the axes of the coils being parallel. When it is essential to have only one forbidden axis, it is only necessary in the case of the arrangement of FIG. 15 to make use of nuclear filters of the type described in French Pat. No. 1,500,971 referred-to in the foregoing.

The invention also admits of a large number of alternative forms. In particular, provision can be made for a frequency meter which is disposed at the output of the operational (differential or summing) amplifier so as to determine the mean magnetic-field strength $$\frac{H_A+H_B}{2}$$

It is apparent that, whatever form of construction is adopted, there is thus provided in all cases a device which serves to measure magnetic-field variations and the operation of which has become sufficiently clear from the foregoing to call for no extended description. This device offers a number of advantages over comparable systems of the prior art and especially the following:

The possibility of measuring the difference in magnetic field $\Delta H$ simply by taking a measurement of phase.

Continuous operation.

The possibility of measuring differences $\Delta H$ of the order of 0.01 gamma, the pass band (namely that of the nuclear resonance filter) being slightly greater than double the width of the nuclear line and of the order of 15 to 20 gammas in the case of protons of deoxidized water placed in fields $H_A$ and $H_B$ of the same order of magnitude as the terrestrial magnetic field.

Very low sensitivity to stray electromagnetic fields; and the measurements taken by the device are practically undisturbed by the displacements which it may undergo during operation.

Small weight and overall size.

The device can have only a single forbidden axis or even none at all.

We claim:

1. A magnetic gradiometer for measuring the difference between the magnetic field intensities in a first and in a second area which comprises, in combination:
   a single oscillator having;
      a first and a second nuclear filter respectively located in said first and second areas, each filter having a system of atomic nuclei and an input and an output coil associated with said system of atomic nuclei for respectively injecting and withdrawing electromagnetic energy at a frequency close to the nuclear magnetic resonance frequency of said system, said input coil and output coil of each filter being electrically decoupled;

an operational amplifier having two inputs and an output;

an adjustable voltage distributor connected between the output of said amplifier and said input coils to divide the output voltage of said operational amplifier between the input coils of said two nuclear filters;

and means for connecting the output coil of each nuclear filter to a respective input of said amplifier, said nuclear filters, connecting means and amplifier being so constructed and arranged that the absolute values of signals applied to said inputs by said means and due to said magnetic field intensities are summed in said amplifier, whereby said oscillator operates on the mean frequency between the nuclear magnetic resonance frequencies of the systems of atomic nuclei associated with said first and second nuclear filters;

and means connected to said output coils for measuring the phase difference between the voltages produced in said output coils of said nuclear filters, said phase difference being in direct relation with the difference between the magnetic field intensities in the two areas where the two nuclear filters are located.

2. A magnetic gradiometer according to claim 1, wherein each of said output coils is connected to one of the inputs of said operational amplifier via a linear amplifier.

3. A magnetic gradiometer according to claim 2, wherein said means for measuring the phase difference includes means for amplifying the voltages delivered by said output coils.

4. A magnetic gradiometer according to claim 2, having means for subjecting the output voltage of said operational amplifier to a 90° phase shift prior to application to the distributor.

5. A magnetic gradiometer according to claim 2, wherein each nuclear filter comprises a paramagnetic substance mixed with said system of atomic nuclei, with said input and output coils having crossed axes and further including a single VHF oscillator having its output coupled to said paramagnetic substance and operating at the electronic resonance frequency of the paramagnetic substance.

6. A magnetic gradiometer according to claim 5, wherein said nuclear filters are identical and said operational amplifier is a summing amplifier.

7. A magnetic gradiometer according to claim 3, wherein each said nuclear filter comprises two parts, each part comprising a paramagnetic substance mixed with the system of atomic nuclei and associated with one of the halves of said output coil and one of the halves of said input coil, said input and output coils having parallel axes and means for saturating the electronic resonance line of the paramagnetic substance wherein the saturation of the electronic resonance line in one of the samples results in an inversion of the spin population of the nuclei in said one part while the saturation of the electronic resonance lines in the other part results in an enhancement of the population difference.

8. A magnetic gradiometer according to claim 7, wherein the two parts of each nuclear filter are identical, each part having two opposite electronic resonance lines at different frequencies, and wherein the means for saturating said lines comprises two VHF oscillators each operating on one of said frequencies and each associated with one of said parts.

9. A magnetic gradiometer according to claim 8, wherein the two parts are different and have opposite electronic resonance lines at the same frequencies and wherein said means for saturating said lines comprises a single oscillator operating at said same frequency and associated with both parts.

References Cited
UNITED STATES PATENTS

| 3,404,332 | 10/1968 | Abragam | 324—0.5 |
| 3,441,838 | 4/1969 | Salvi | 324—0.5 |
| 3,441,841 | 4/1969 | Salvi | 324—0.5 |

MICHAEL J. LYNCH, Primary Examiner